No. 690,745. Patented Jan. 7, 1902.
N. LISTON.
ADJUSTABLE BRAKE BLOCK FOR VEHICLES.
(Application filed Apr. 17, 1901.)
(No Model.)
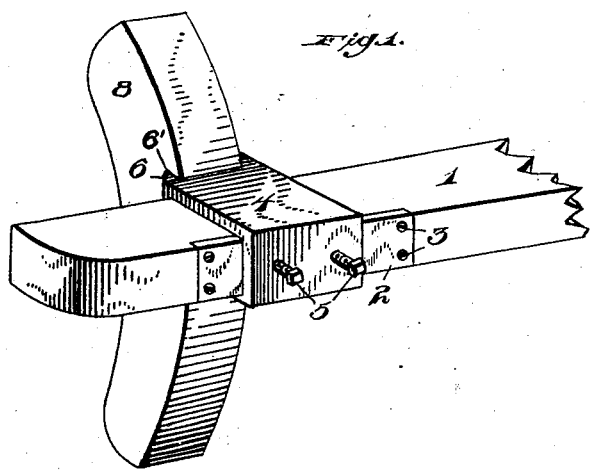
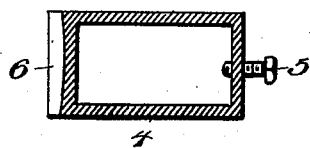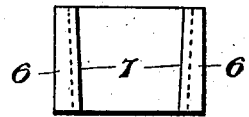
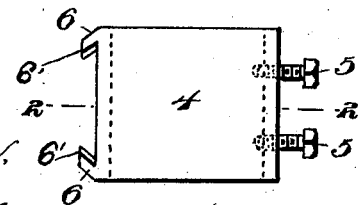
Witnesses:
J. S. Appleman
E. E. Potter
Inventor
Noah Liston
By
H. C. Evert &c.
Attys.
THE NORRIS PETERS CO., PHOTO-LITHO., WASHINGTON, D. C.

UNITED STATES PATENT OFFICE.

NOAH LISTON, OF TURTLECREEK, PENNSYLVANIA.

ADJUSTABLE BRAKE-BLOCK FOR VEHICLES.

SPECIFICATION forming part of Letters Patent No. 690,745, dated January 7, 1902.

Application filed April 17, 1901. Serial No. 56,223. (No model.)

*To all whom it may concern:*

Be it known that I, NOAH LISTON, a citizen of the United States of America, residing at Turtlecreek, in the county of Allegheny and State of Pennsylvania, have invented certain new and useful Improvements in Adjustable Rubber Blocks for Vehicles, of which the following is a specification, reference being had therein to the accompanying drawings.

This invention relates to certain new and useful improvements in adjustable rubber blocks for vehicles.

The present invention has for its object the provision of novel means whereby a rubber block carried by the brake-beam may be adjusted laterally upon the brake-beam in order to utilize the entire surface of the block and wear the same in a uniform manner, as shown.

The rubber blocks are usually constructed of greater width than the periphery of the tire of the wheel, and it is only the central portion of the rubber block that is worn away. The sides thereof not being brought into contact with the tire are not utilized. It is the aim of the present invention to overcome this difficulty by rendering the block adjustable in order to utilize the entire engaging surface of the block against the periphery of the wheel.

The present invention further aims to construct an adjustable guide that may be easily removed from the brake-beam and a new rubber block inserted therein when the occasion requires.

The invention has for its still further object to construct a block of this character which will be extremely simple in construction, strong, durable, and comparatively inexpensive to manufacture; furthermore, one that will be highly efficient in its use.

In describing the invention in detail reference is had to the accompanying drawings, forming a part of this specification, and wherein like numerals of reference indicate corresponding parts throughout the several views, in which—

Figure 1 is a perspective view of the end of a brake-beam having my improved block secured thereto. Fig. 2 is a longitudinal sectional view of the adjustable yoke. Fig. 3 is an end view of the same, showing the wedge-shaped dovetailed guides arranged thereon. Fig. 4 is a top plan view of the yoke.

In the drawings, the reference-numeral 1 indicates the brake-beam, having secured on its face a metal plate 2, suitably secured to the brake-beam by means of screws 3 or other suitable fastening means. This plate is preferably countersunk in the brake-beam, as shown in Fig. 1 of the drawings.

The reference-numeral 4 indicates the yoke, having arranged therein set-screws 5 on its one side, said set-screws engaging the plate 2, and on the other side a yoke is provided with a dovetailed guide 6, which is slightly wedge-shaped, as shown at 7. Said yoke is rectangular in form and is adapted to receive the end of the brake-beam 1, the latter projecting therefrom.

The reference-numeral 8 represents the rubber block secured in the dovetailed guide, and as the latter is forced into said guide downwardly the block is securely wedged therein.

Many advantages are derived from the special form of guides employed in my invention—to-wit, the use of any rubber block and the adaptability of the guides being bent in to engage the block, and thus securely hold the same, which is very ably accomplished by means of the guides 6, having their inner ends V-shaped and converging to a point, as at 6', which allows of the points 6' grasping the block and preventing movement of the latter.

The lateral adjustment of the rubber block is easily obtained by loosening the set-screws 5 and allowing the yoke to slide upon the brake-beam to the desired position that will effect the engagement of the tire with the rubber block upon the surface where it is desired to be used.

I desire to call particular attention to the use of the metal plate 2, which allows of the set-screws 5 being brought to bear thereon, securely holding the yoke against displacement. Heretofore it has been found that the screws when bearing against the wooden beam seriously depress and otherwise mar the wood, thus in a short while rendering the brake-beam unfit for use, which defect I overcome by use of my improved device.

The many advantages obtained by my improved device will be readily apparent from the foregoing description, taken in connection with the accompanying drawings, and it will be noted that various changes may be made in the details of construction without departing from the general spirit of my invention.

Having fully described my invention, what I claim as new, and desire to secure by Letters Patent, is—

In a device of the character described, the combination with a rectangular brake-beam, of a rectangular yoke, the sides and ends of which are at right angles to one another, the inner and outer faces of the said sides and ends being perfectly flat, the said yoke adapted to be slidably mounted on said brake-beam, the outer face of one of said ends being concaved to receive the rear face of the rubber block, guides extending the entire length of the said face and made integral with the extremities thereof, said guides being of greater width at the top and converging toward the bottom, the inner ends of said guides being V-shaped and adapted to grasp the sides of the rubber block throughout their entire length, the opposite face of said yoke having a single pair of screw-threaded apertures formed therein, a single pair of set-screws operating in said apertures, a rectangular plate of greater length than the width of said yoke countersunk and secured in one face of said brake-beam with its outer face and upper and lower edges exposed, the exposed portion of said rectangular plate adapted to engage a portion of the inner surface of said yoke, the outer face of said plate adapted to be engaged by said single pair of set-screws, and a rubber block segmental in shape and rectangular in cross-section adapted to be engaged by the entire inner surfaces of the said guides and concaved face, substantially as described.

In testimony whereof I affix my signature in the presence of two witnesses.

NOAH LISTON.

Witnesses:
JOHN NOLAND,
E. E. POTTER.